Patented Apr. 17, 1923.

1,452,083

UNITED STATES PATENT OFFICE.

AUGUST LEOPOLD LASKA AND ARTHUR ZITSCHER, OF OFFENBACH-ON-THE-MAIN, GERMANY, ASSIGNORS TO CHEMISCHE FABRIK GRIESHEIM-ELEKTRON, OF FRANKFORT-ON-THE-MAIN, GERMANY, A CORPORATION.

BLACK AZO DYESTUFFS AND PROCESS OF MAKING SAME.

No Drawing. Application filed August 9, 1922. Serial No. 580,759.

*To all whom it may concern:*

Be it known that we, AUGUST LEOPOLD LASKA and ARTHUR ZITSCHER, both doctors of philosophy, citizens of the German Republic, and residents of Offenbach-on-the-Main, Germany, have invented certain new and useful Improvements in Black Azo Dyestuffs and Processes of Making Same, of which the following is a specification.

Our invention relates to the production of azo dyestuffs consisting in combining the diazo compound of an aryl-azo-1-naphthylamin compound (not containing a sulfo group, with an arylamid of 2.3-oxynaphthoic acid.

The new dyestuffs, having probably the general formula:

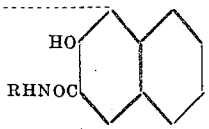

wherein X means the residue of an 1-naphthylamin compound capable of combining in the 4-position and not containing a sulfo group, R an aromatic radical, are when dry black powders, with metallic lustre, insoluble in water and soluble in concentrated sulfuric acid to a blue to green solution, yielding upon reduction with stannous chlorid an arylamin, an 1.4-diamino-compound of the napththalene series and an arylid of 1-amino-2-oxy-3-naphthoic acid, and dyeing, when produced on the fiber, cotton in black shades of an excellent fastness.

As diazocomponents can be used all the amino-azo-compounds, which are obtained by combining diazotized aromatic amins, such as anilin, its homologues and substitution products such as toluidines, xylidines, anisidines, phenetidines, cresidines, thio-anisidines and their negatively substituted derivatives such as chloro-derivatives, monoacylphenylen-diamines, and aminoquinolines, naphthylamins and so on with 1-naphthylamin or its derivatives capable of combining in 4-position and not containing a sulfo group, such as 1-aminonaphtholalkylether, 1-aminomethylnaphthalene and so on.

As azo components all the arylamids of 2.3-oxynaphthoic acid can be used, such as the anilid, toluidides, anisidids and phenetidids, α- and β-napthalid, nitroanilids, di-m-toluylene and p-phenylendiamin compounds, whereby two molecules of the diazo compound react, arylids chloro-substituted in the arylid residue and so on.

According to the component used reddish, bluish or greenish darkly black shades are obtained.

The fastness to light of the colored fabrics can be increased by an after treatment with copper salts.

The following examples illustrate the invention, the parts being by weight.

EXAMPLE 1.

30.5 parts of o-ethoxy-m-toluene-azo-1-naphthylamin are dissolved in 40 parts of hydrochloric acid 20° Bé. and about 4500 parts of water and diazotized in the usual manner with 6.0 parts of sodium nitrite. The diazo compound so formed, is separated by filtration from a small quantity of impurities. 29.3 parts of p-anisidid of 2.3-oxynaphthoic acid are dissolved in 20 parts of caustic soda lye 36° Bé. and 200 parts of warm water after addition of an aqueous solution of 13 parts of sodium acetate and 2 parts of Turkey red oil, cooled with ice to about 10° C. and filtered.

This solution is poured while stirring into the diazo-solution at 10—15° C. When the combination is complete the dyestuff, thus formed is filtered, washed and dried. It forms a bluish black powder with metallic lustre, soluble in concentrated sulfuric acid to a green solution and precipitatable by water in bluish black flakes.

EXAMPLE 2.

*Dyeing yarn.*

PADDING-BATH.

140 gr. of the anilid or 120 gr. of the alpha-naphthalid of 2.3-oxynaphthoic acid are stirred with 200 cc. of caustic soda lye 34° Bé. and 250 cc. of Turkey red oil, dissolved in boiling water and made up with cold water to 10 litres.

The yarn, which is well boiled with carbonate of soda or caustic soda, is handled for some minutes in the solution of the arylid of 2.3-oxynaphthoic acid, wrung out as well as possible and introduced, either in a wet condition or dried, into the following dye-bath.

DYE-BATH.

50 gr. of benzene-azo-1-naphthylamin or 56 gr. of o-anisol-azo-1-naphthylamin are diazotized after addition of 60 cc. of hydrochloric acid 20° Bé. and 3000 cc. of cold water by means of a solution of 15 gr. of nitrite of soda in 100 cc. of water. The whole is made up to 10 litres.

Before using the free mineral acid is neutralized with acetate of soda. The padded yarn is handled for some time in the dye bath, washed, soaped and finished.

EXAMPLE 3.

*Dyeing piece-goods.*

PADDING-BATH.

120 gr. of α-naphthalid or 80 gr. of β-naphthalid of 2.3-oxynaphthoic acid are dissolved with 200 cc. of caustic soda lye 34° Bé. and 250 cc. of Turkey red oil in the quantity of water, which is necessary at 30–40° C. to 10 litres.

The piece is padded with the solution, strictly pressed or dried and introduced in the following dye-bath.

DYE-BATH.

73 gr. of p-toluene-azo-1-amino-2-naphthol-methylether are diazotized after addition of 75 cc. hydrochloric acid 20° Bé. and the quantity of water, which is necessary, by means of a solution of 18.7 gr. nitrate of soda in 100 cc. of water and made up to 10 litres.

Before using the free mineral acid is neutralized with acetate of soda.

The following table gives some of the shades obtained according to this invention:

| Diazo compound of the amino-azo compound from— | Combined with the arylid of 2.3-oxynaphthoic acid. | Shade. |
|---|---|---|
| Anilin+1-naphthylamin | Anilid(example 2). | Reddish black. |
| O-anisidin+......do......... | .....do............ | Violet-black. |
| P-anisidin+......do......... | .....do............ | Bluish black. |
| M-anisidin+......do......... | .....do............ | Violet-black. |
| P-phenetidin+....do......... | .....do............ | Do. |
| P-xylidin+......do......... | .....do............ | Bluish black. |
| P-cresidin+......do......... | P-anisidid (example 1). | Do. |
| O-anisidin+......do......... | β-naphthalid...... | Black. |
| P-cresidin+......do......... | .....do............ | Bluish black. |
| P-cresidin+1-amino-2-methylnaphthalin. | .....do............ | Violet-black. |
| P-toluidin+1-amino-2-naphtholmethylether. | .....do.(example 3) | Bluish black. |
| P-cresidin+1-amino-2-naphtholmethylether. | .....do............ | Greenish black. |
| P-anisidin+1-amino-2-naphtholethylether. | .....do............ | Do. |
| O-anisidin+1-naphthylamin | α-naphthalid (example 2). | Violet-black. |
| P-toluidin+......do...... | .....do............ | Reddish black. |
| P-cresidin+......do...... | .....do............ | Violet-black. |
| O-aminoquinoline+..do...... | .....do............ | Do. |
| P-cresidin+1-amino-2-methylnaphthalene. | .....do............ | Do. |
| O-chloranilin+1-amino-2-naphtholmethylether. | .....do............ | Greenish black. |
| M-chloranilin+1-amino-2-naphtholmethylether. | .....do............ | Do. |
| P-chloranilin+1-amino-2-naphtholmethylether. | .....do............ | Black. |
| P-toluidin+1-amino-2-naphtholmethylether. | .....do.(example 3) | Bluish black. |
| O-anisidin+1-amino-2-naphtholmethylether. | .....do............ | Black. |
| 4-Chloro-1.2-anisidine+1-amino-2-naphtholmethylether. | .....do............ | Greenish black. |
| 4-Aminothio-anisol+1-amino-2-naphtholmethylether. | .....do............ | Do. |
| O-phenetidin+1-amino-2-naphtholethylether. | .....do............ | Greenish black. |

Now what we claim and desire to secure by Letters Patent is the following:

1. As new articles the azo dyestuffs, which can be obtained by combining the diazo compound of an aryl-azo-1-naphthylamin compound not containing a sulfo group with an aryl-amid of 2.3-oxynaphthoic acid which dyestuffs have probably the general formula:

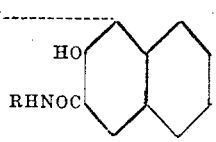

wherein X means the residue of an 4-naphthylamin compound capable of combining in the 4-position and not containing a sulfo group, R an aromatic radical, which dyestuffs are when dry, black powders with metallic lustre, insoluble in water and soluble in concentrated sulfuric acid to a blue to green solution, yielding upon reduction with stannous chlorid an arylamin, a 1.4-diamino compound of the naphthalene series and an arylid of 1-amino-2-oxy-3-naphthoic acid, and, when produced on the fiber, dyeing cotton in black shades of an excellent fastness.

2. Textile material dyed with the new azodyestuff as covered in claim 1, said dyestuff being developed on the material.

3. As new articles the azo dyestuffs, which can be obtained by combining an alkoxyphenyl-azo-1-naphthylamin compound not containing a sulfo group with an arylamid of 2.3-oxynaphthoic acid, which dyestuffs have probably the general formula

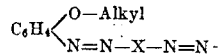
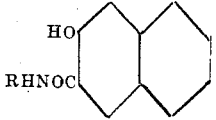

wherein X means the residue of an 1-naphthylamin compound capable of combining in 4-position and not containing a sulfo group, R an aromatic radical, which dyestuffs are when dry black powders with metallic lustre, insoluble in water and soluble in concentrated sulfuric acid to a blue to green solution, yielding upon reduction with stannous chlorid an alkoxy-anilin, a 1.4 diamino-compound of the naphthalene series and an arylid of 1-amino-2-oxy-3-naphthoic acid, and, when produced on the fiber, dyeing cotton in black shades of an excellent fastness.

4. Textile material dyed with the new azodyestuff as covered in claim 3, said dyestuff being developed on the material.

5. As new articles the azo dyestuffs, which can be obtained by combining the diazo compound of an alkoxy-phenyl-azo-2-alkoxy-1-naphthylamin with an arylamid of 2.3-oxy-naphthoic acid which dyestuffs have probably the general formula:

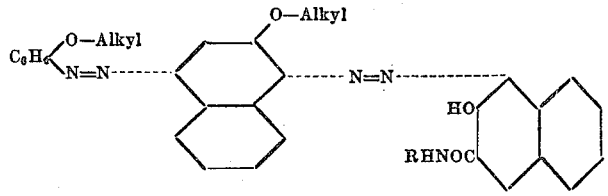

wherein R means an aromatic radical, which dyestuffs are when dry black powders with metallic lustre, insoluble in water and soluble in concentrated sulfuric acid to a blue to green solution, yielding upon reduction with stannous chlorid an alkoxy-anilin, a 2-alkoxy 1.4-diaminonaphthalene and an arylid of 1-amino-2-oxy-3-naphthoic acid, and when produced on the fiber, dyeing cotton in black shades of an excellent fastness.

6. Textile material dyed with the new azo-dyestuff as covered in claim 5, said dyestuff being developed on the material.

7. As new articles the azo dyestuffs, which can be obtained by combining the diazo compound of an alkoxy-phenyl-azo-2-alkoxy-1-naphthylamin with a naphthalid of 2.3-oxynaphthoic acid, which dyestuffs have probably the general formula

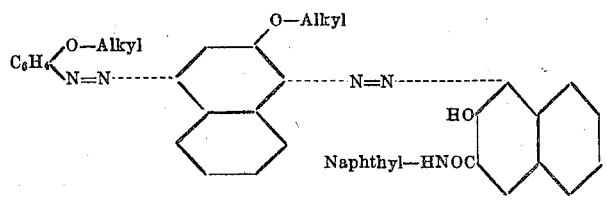

which dyestuffs are when dry black powders with metallic lustre, insoluble in water and soluble in concentrated sulfuric acid to a blue to green solution, yielding upon reduction with stannous chlorid an alkoxy-anilin, a 2-alkoxy-1.4-diaminonaphthalene and a naphthalid of 1-amino-2-oxy-3-naphthoic acid, and, when produced on the fiber, dyeing cotton in black shades of an excellent fastness.

8. Textile material dyed with the new azo-dyestuff as covered in claim 7, said dyestuff being developed on the material.

Signed at Frankfort a/M., Germany, this 8th day of May, A. D. 1922.

AUGUST LEOPOLD LASKA.
ARTHUR ZITSCHER.

Witnesses:
PETER LAUTENSCHLAGER,
FRIEDRICH DÉSOR.